US011302316B2

(12) United States Patent
Christopher et al.

(10) Patent No.: US 11,302,316 B2
(45) Date of Patent: Apr. 12, 2022

(54) VOICE ACTIVATED LABORATORY ENVIRONMENTS

(71) Applicant: ETS-Lindgren Inc., Cedar Park, TX (US)

(72) Inventors: Michael Duane Christopher, Leander, TX (US); Radhika Kozhikodakatha Menon, Austin, TX (US)

(73) Assignee: ETS-Lindgren, Inc., Cedar Park, TX (US)

( * ) Notice: Subject to any disclaimer, the term of this patent is extended or adjusted under 35 U.S.C. 154(b) by 274 days.

(21) Appl. No.: 16/049,400

(22) Filed: Jul. 30, 2018

(65) Prior Publication Data

US 2019/0392825 A1 Dec. 26, 2019

Related U.S. Application Data

(60) Provisional application No. 62/688,853, filed on Jun. 22, 2018.

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC .... G10L 15/22; G10L 2015/223; G06F 3/167
USPC ...................................................... 704/275
See application file for complete search history.

(56) References Cited

U.S. PATENT DOCUMENTS

2020/0202863 A1\* 6/2020 Paul ..................... G06F 3/167

\* cited by examiner

*Primary Examiner* — Thierry L Pham
(74) *Attorney, Agent, or Firm* — Christopher & Weisberg, P.A.

(57) ABSTRACT

A method, system and apparatus for implementation and use of voice activated laboratory environments (VALET) are disclosed. According to one aspect, a VALET controls a first instrument in a first location, and has, in acoustic proximity to the first location, an audio interface configured to receive voice commands, to enunciate responses to the voice commands, and to transmit a first signal responsive to a first voice command to an intermediary location. The VALET also includes a computer configured to receive a computer instruction from the intermediary location, the computer instruction configuring the computer to select and issue an instrument command to cause the first instrument to effectuate the voice command.

10 Claims, 11 Drawing Sheets

VOICE ACTIVATED LABORATORY ENVIRONMENTS

PRIORITY

This application claims priority of U.S. Provisional Patent Application Ser. No. 62/688853, filed on Jun. 22, 2018, and entitled "Voice Activated Laboratory Environments," which is incorporated herein in its entirety.

FIELD

The present disclosure relates to laboratory instrumentation, and in particular, to implementation and use of voice activated laboratory environments (VALET).

INTRODUCTION

The following patents, publications and patent applications, owned by, ETS-Lindgren Inc., the assignee of the present invention describe various examples of laboratory instrumentation configurations, and are incorporated in their entirety herein by reference:

U.S. Pat. No. 8,330,640 describes a compact range having a parabolic reflector as shown in FIG. 1. FIG. 1 shows a top view of an integrated chamber 500 with absorber 502 and the compact range reflector 504 with a source 506 partially shielded by absorber 508 and with a test zone 510. To substantially reduce or practically eliminate edge diffractions, the outer periphery of the reflector 504 is extended all the way to the walls, floor, and ceiling (peripheral surfaces of the chamber) as shown at 512. The source 506 is an antenna whose direction may be adjusted by a motor that controls a position and/or orientation of the source 506. The position/orientation of the source 506 may be controlled via test equipment located outside the chamber 500. A device to be tested in the test zone 510 may be positioned on a moveable positioner whose position is controlled by the test equipment located outside the chamber 500.

U.S. Pat. No. 8,326,229 describes a test arrangement using propagation path corridors to connect separate regions in an anechoic chamber as shown in FIG. 2. FIG. 2 shows anechoic chambers connected by propagation corridors with different types of elements in each chamber. Thus, one chamber 72 has a wireless device and a rotating absorber and partially absorber covered walls. Another chamber 74 contains a stationary DUT. Another chamber 76 contains a DUT on a positioner. Another chamber 78 shows MIMO antennas that are connected to external test equipment. Thus any combination of chamber types and elements may be employed using propagation path corridors to connect the chambers. The propagation path corridors may be configured to produce variable delay and/or attenuation between the different chambers 72, 74, 76 and 78. The instrument to control the propagation path corridors may be located outside the chamber having the antennas, devices and absorbers.

U.S. Pat. No. 8,655,284 describes various test implementations in an anechoic or partially anechoic chamber that have positioners and radiating elements that can be controlled via test equipment located outside the chamber.

U.S. Pat. No. 8,331,869 describes an anechoic chamber 804 that has multiple antennas 806 surrounding a device under test 802, as shown in FIG. 3. The antennas 806 are connected to a variable path simulator 808 located exterior to the DUT 802. The variable path simulator is connected to a multiple input multiple output (MIMO) tester 810, all of which may be controlled by a user.

U.S. Pat. No. 9,482,708 is a diagram of an enhanced reverberation chamber 10 having a floor 12, ceiling 14, and four sides 16 (only two sides shown) to enclose a device under test, DUT, as shown in FIG. 4. In FIG. 4, a measurement antenna 20 is mounted on a first positioner 21, and a calibration antenna 22 is mounted on a second positioner 23. The antennas may be omni-directional or highly directional. In the alternative to a calibration antenna 22, a device to be tested may be mounted on the second positioner 23. The second positioner 23 may be fixed or moveable. In another alternative embodiment, a measurement antenna may be mounted on the second positioner 23 and a device to be tested may be mounted on the first positioner. Thus, the first positioner 21 carries a first device involved in a test, and the second positioner 23 carries a second device involved in the test. The reverberation chamber 10 may also include a tuner or mode stirrer such as a horizontal z-fold tuner 26 and/or a vertical z-fold tuner 28. The positions and motion of the positioners and the rotation of the tuners 26 and 28 may be controlled by software, test equipment and/or a user located exterior to the reverberation chamber 10. Also, the frequency of operation of the antennas 20 and 22 may be controlled by equipment located outside the reverberation chamber 10.

U.S. patent application Ser. No. 15/967,051 depicts a closed loop power adjustment system for a boundary array having a plurality of antennas in an anechoic chamber and equipment to separately monitor and control the power delivered to each antenna.

U.S. Pat. No. 10,009,122 described distributed processing in a boundary array. In some embodiments, at least some of the processing for emulating one or more propagation channels is performed within an anechoic chamber. This processing may be controlled at least in part by test equipment located within or without the chamber.

U.S. Patent Application Publication No. 2018/0027434 describes robotic arms (positioners) 20a and 20b that carry antennas 19a and 19b and may be positioned about a spherical surface about a DUT 1 mounted on a positioner 28 as shown in FIG. 5. In some embodiments, the first positioner 20a scans about the hemisphere 70a and the second positioner 20b scans about the hemisphere 70b. Other scanning surfaces may be implemented. The second positioner 20b may be configured for power measurement of the signals produced by the DUT 1. The first positioner 20a and a communication test system may be used to establish a link to the DUT 1 and cause it to adapt its antenna configuration (e.g. beamforming) to the desired orientation and polarization by moving the positioner 20a and antenna 19a to a chosen position and orientation relative to the DUT 1. Once the communication link is established, the second positioner 20b may be used to probe, via an antenna 19b, the radiation pattern of the DUT 1 while it communicates with the first antenna 19a in the chosen position. Note that a first communication endpoint 30a may be mounted somewhere on or in the vicinity of the first positioner 20a and a second communication endpoint 30b may be mounted somewhere on or in the vicinity of the second positioner 20b. Note that each positioner 20a and/or 20b may, in some embodiments, be positioned manually, or their positions may be controlled by a remotely located device or a local device such as a controllable motor. Similarly, the communication endpoints 30 may be controlled remotely to vary the content and frequency of signals to be transmitted by the antennas 19.

U.S. patent application Ser. No. 15/892,042, FIG. 6 shows positioning of antennas 8 and 16 specified by the angles $\theta_1$, $\theta_2$, $\phi_1$ and $\phi_2$ relative to the DUT. The angle $\phi_2$ corresponds to a clockwise (or counterclockwise) rotation of the support structure 3, and $\theta_2$ corresponds to a clockwise (or counterclockwise) rotation of the support arm 18. As shown in FIG. 6, the support arm 14 is curved to avoid striking the base 17 or support arm 18. Similarly, the second support arm 18 may also be curved. In addition, or alternatively, the base structures 15 and 17 may be spaced apart to avoid mechanical interference between the first and second support arms 14 and 18. The positions of support arms 14 and 18 and base structures 15 and 12 may be controlled by equipment located remotely or locally.

Some or all of the above documented configurations include at least a first location where first instrumentation is located and/or a second location where second instrumentation is located, where the second instrumentation controls, affects or alters the operation of the first instrumentation and/or vice versa. For example, the first location may be an anechoic chamber with the first instrumentation including any one or more of one or more positioners, one or more antennas, and/or one or more other instruments. The second location may be a monitoring or control location with the second instrumentation including any one or more of one or more signal generators, one or more signal analyzers, one or more computers, one or more video displays, one or more positioner control instruments, one or more power attenuators or amplifiers, one or more controllable couplers, one or more switches, etc.

Thus, in many cases, a person working within the first location wants to control, affect or alter a first item of instrumentation located within the first location (such as the positioner upon which is mounted a device under test, or an antenna), the first item of instrumentation being controlled or governed by a second item of instrumentation located in the second location. For example, suppose the person working in an anechoic chamber wants to change the position of an antenna mounted on a positioner that is controlled by a position controller located outside the anechoic chamber. To change the position, therefore, the person must exit the anechoic chamber, adjust the position controller, and then return to the anechoic chamber to continue working. This is time consuming, inconvenient and increases the difficulty of setting up and conducting a test.

In the alternative, a second person may be placed at the position controller, and the person within the chamber may shout the change in position to the second person, who responds by adjusting the position controller, and then shouts back to the person in the chamber that the adjustment to the position controller has been made. Implementing either of these two scenarios is costly and inefficient. The same inefficiencies arise if the person working within the chamber wants to change the frequency of operation of an antenna probe that is controlled by a signal generator located outside the chamber.

As another example, suppose that while working in the chamber, the person decides that he needs technical assistance or needs to consult a manual. In this example, the person would have to stop what he is doing, leave the chamber and go to a phone to call for technical assistance or read the manual.

As another example, suppose a person is at a test bench working on troubleshooting a circuit using a dual channel oscilloscope. Suppose further that both his hands are occupied, each hand holding a different probe connected to the oscilloscope. Now, if he wants to adjust a setting of the oscilloscope, he must release one of the probes, make the adjustment and then manually reacquire the probe. This too is inefficient.

SUMMARY

Methods, computers and intermediary systems are provided. According to some embodiments, a method for controlling at least one instrument in a lab environment. The method includes providing, in acoustic proximity to a first location having a first instrument in the lab environment, an audio interface configured to receive voice commands and to transmit a first electrical signal responsive to a first voice command to an intermediary location. The method further includes receiving, from the intermediary location, at a computer at a second location, a computer instruction, the computer instruction configuring the computer to select and issue an instrument command to cause the first instrument to effectuate the voice command.

According to this aspect, in some embodiments, the computer is embedded in one of the first instrument and a second instrument configured to control the first instrument. In some embodiments, the instrument command is selected from a table of instrument commands associated with the one of the first and second instrument. In some embodiments, the instrument command is selected via a computer program that associates a universal set of voice commands with an instrument type, and associates a voice command with an instrument command for a particular make and model of the instrument type. In some embodiments, the second location is in close proximity to the first location. In some embodiments, the instrument command is issued by the using a Virtual Instrument Software Architecture (VISA). In some embodiments, the computer obtains the computer instruction by polling a buffer at the intermediary location. In some embodiments, the voice command is a command to direct the first instrument to perform a sequence of operations and the computer issues at least one instrument command to cause the first instrument to perform the sequence of operations. In some embodiments, the first location in the lab environment includes a test region and the second location is in a control and monitoring region for controlling and monitoring a test of a device in the test region. In some embodiments, the audio interface and the computer are portable.

According to another aspect, voice activated lab environment (VALET) is provided. The VALET includes in acoustic proximity to a first location, an audio interface configured to receive voice commands and to transmit a first signal responsive to a first voice command to an intermediary location. The VALET also includes a computer at a second location configured to receive a computer instruction from the intermediary location, the computer instruction configuring the computer to select and issue an instrument command to cause a first instrument to effectuate the voice command.

According to this aspect, in some embodiments, the first location is in a test chamber and the second location is at a monitoring/control station exterior to the chamber. In some embodiments, the audio interface is shielded by an acoustically penetrable electromagnetic shield. In some embodiments, the first instrument is a positioner and the issued instrument command causes the positioner to position the positioner responsive to the voice command. In some embodiments, the first instrument is one of a transmitter and a receiver and the issued instrument command sets a frequency of operation of the one of the transmitter and receiver responsive to the voice command. In some embodiments, the first voice command is a question and the audio interface answers the question based on a signal received from the intermediary location, the signal received from the intermediary location being based on a signal received from the computer, the signal received from the computer based on a message received from one of the first instrument and a second instrument configured to control the first instrument. In some embodiments, the first voice command is one of an instruction, a request and a question.

According to yet another aspect, an intermediary system for interpreting and relaying commands from and to an audio interface is provided. The system includes a first interface configured to receive a first signal responsive to a voice command received by the audio interface located in acoustic proximity to a first instrument. The system also includes a processor configured to recognize the voice command by analysis of the first signal, the analysis of the first signal identifying a type of instrument operable to effectuate the voice command. The processor is also configured to generate a computer instruction in response to the recognized voice command, the computer instruction configured to cause a computer in another location to identify at least one instrument command that when issued to an instrument effectuates a response in accordance with the voice command. The system also includes a second interface configured to send the computer instruction to the computer.

According to yet another aspect, a computer for executing instructions to control an instrument in response to a voice command detected by an audio interface is provided. The computer includes a first interface to receive a computer instruction from an intermediary location, the computer instruction conveying an identity of an instrument and a command derived from the voice command detected by the audio interface. The computer also includes processing circuitry configured to select an instrument command to cause the instrument to effectuate the voice command. The computer also includes a second interface to issue the instrument command to the instrument. According to some embodiments, the selection of the instrument command is performed by identifying a make and model of the instrument and selecting a corresponding instrument command from a table of instrument commands for the identified make and model of instrument.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
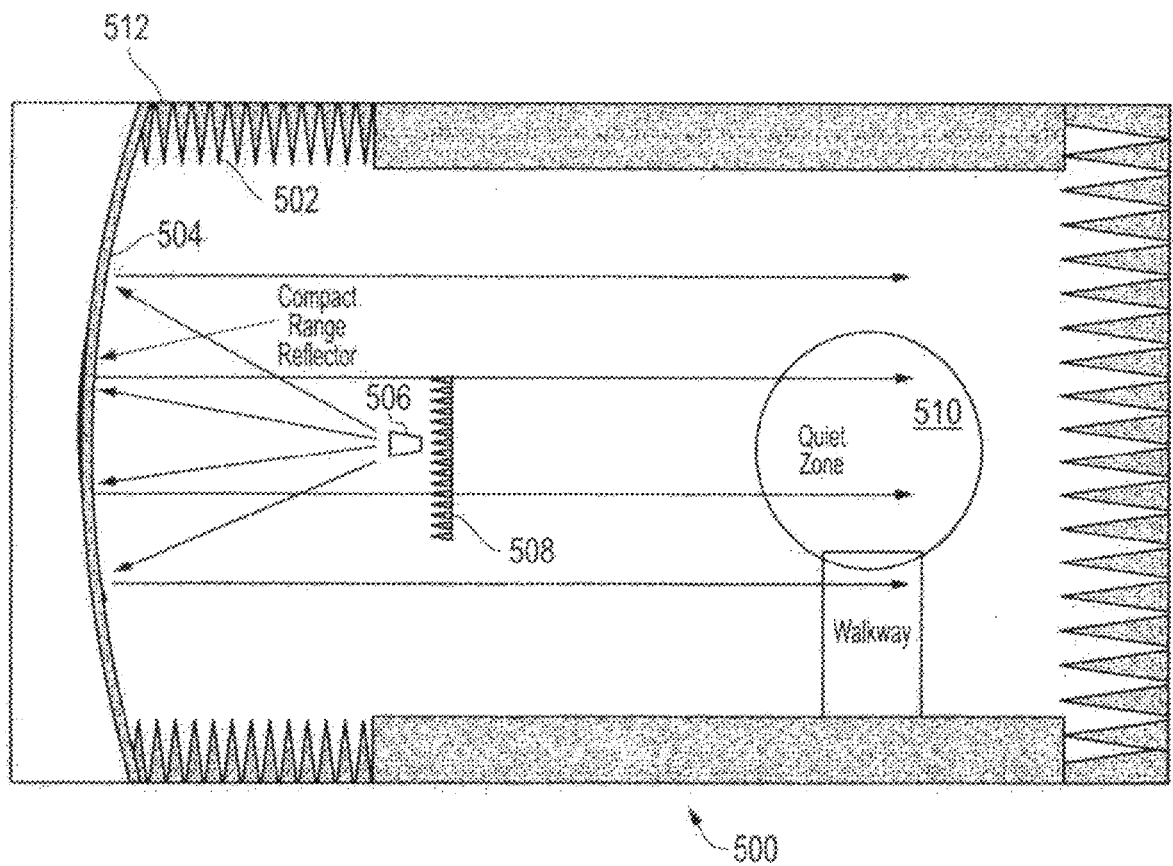
FIG. 1 illustrates a compact range having an antenna, a reflector, and absorber.
Figure 2:
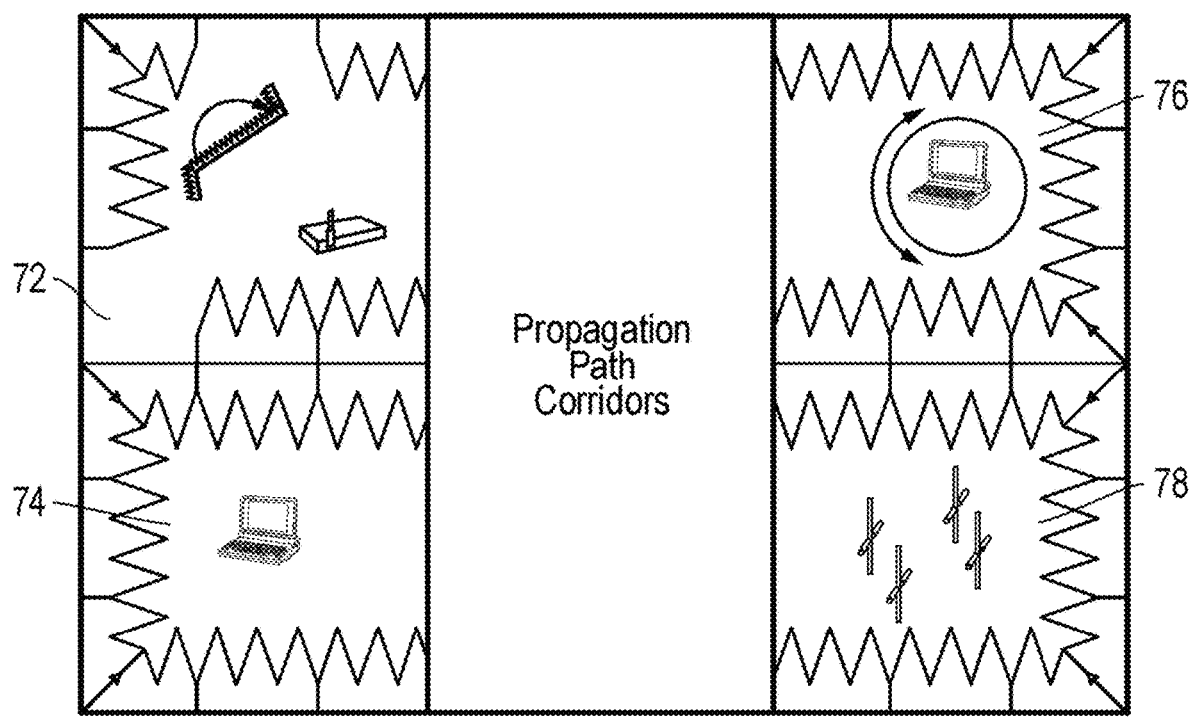
FIG. 2 illustrates a chamber having four sub-chambers connected by propagation path corridors.
Figure 3:
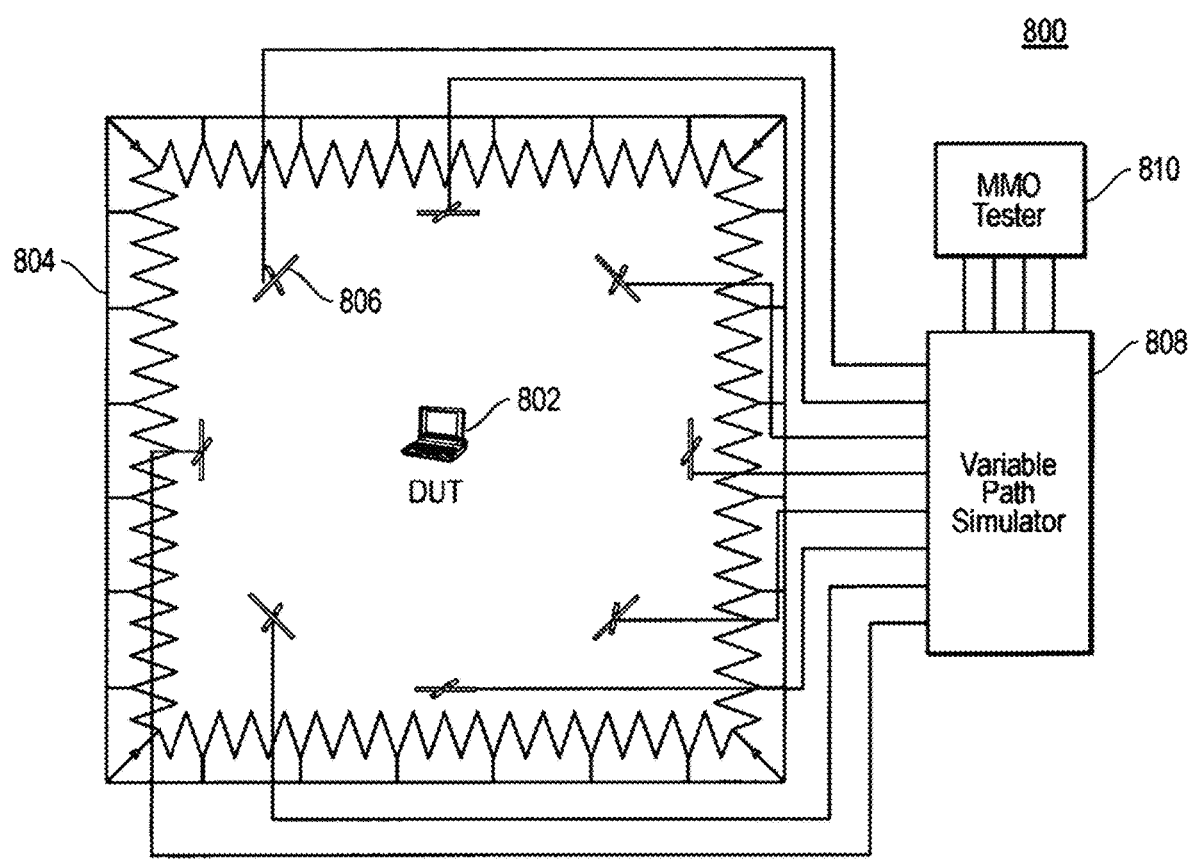
FIG. 3 illustrates an anechoic chamber with an array of antennas, and exterior to the anechoic chamber, a variable path simulator and a MIMO tester.
Figure 4:
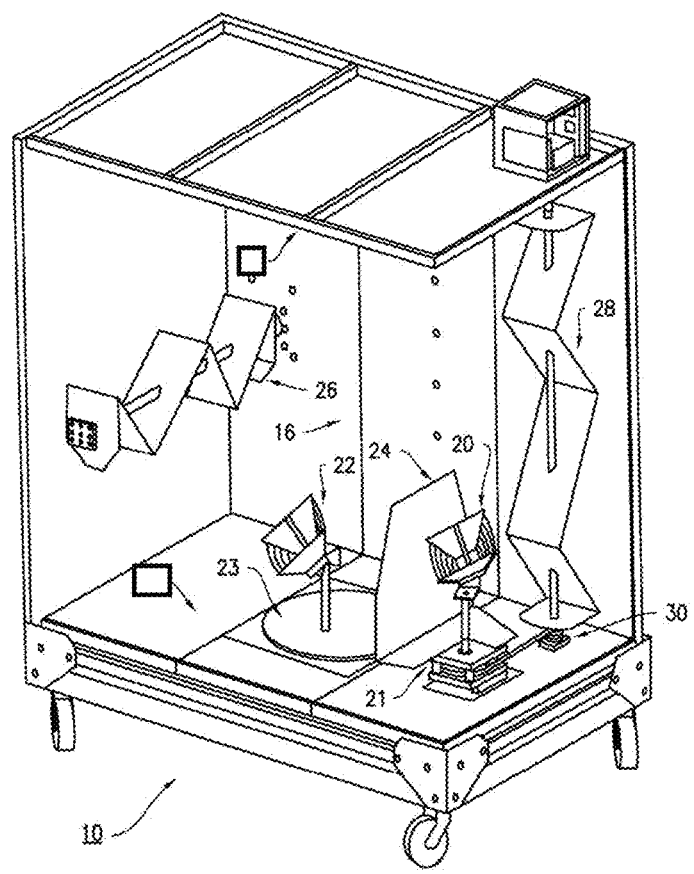
FIG. 4 illustrates a reverberation chamber with antennas on rotatable positioners and mode stirrers.
Figure 5:
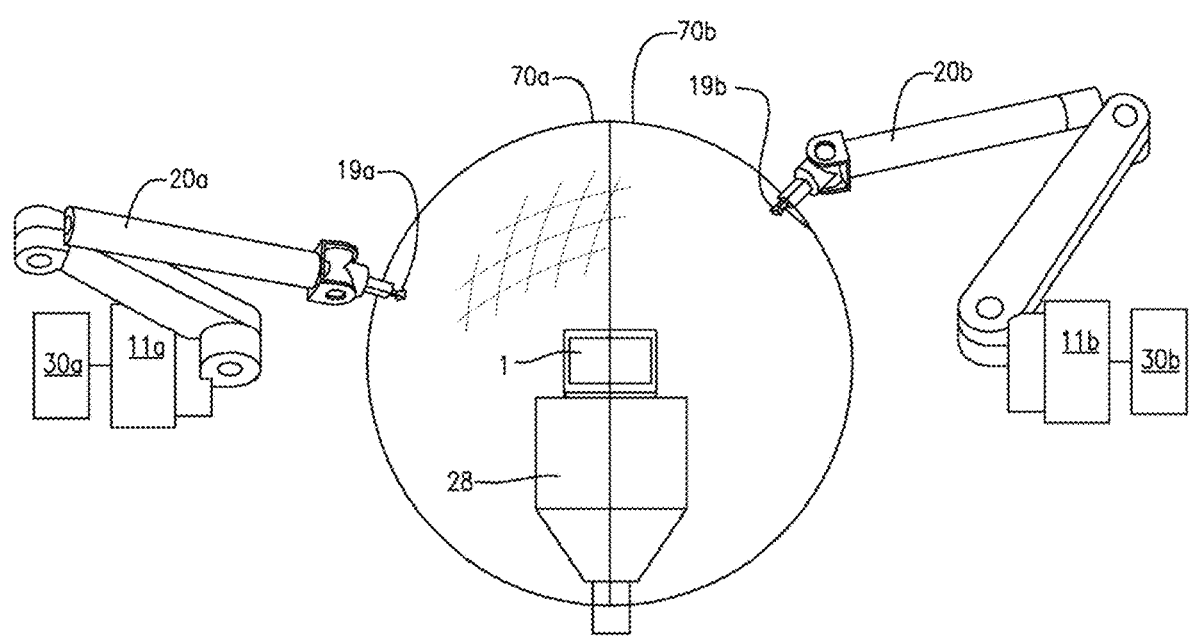
FIG. 5 illustrates two robotic arms positioning antennas about a device under test mounted on a positioner.
Figure 6:
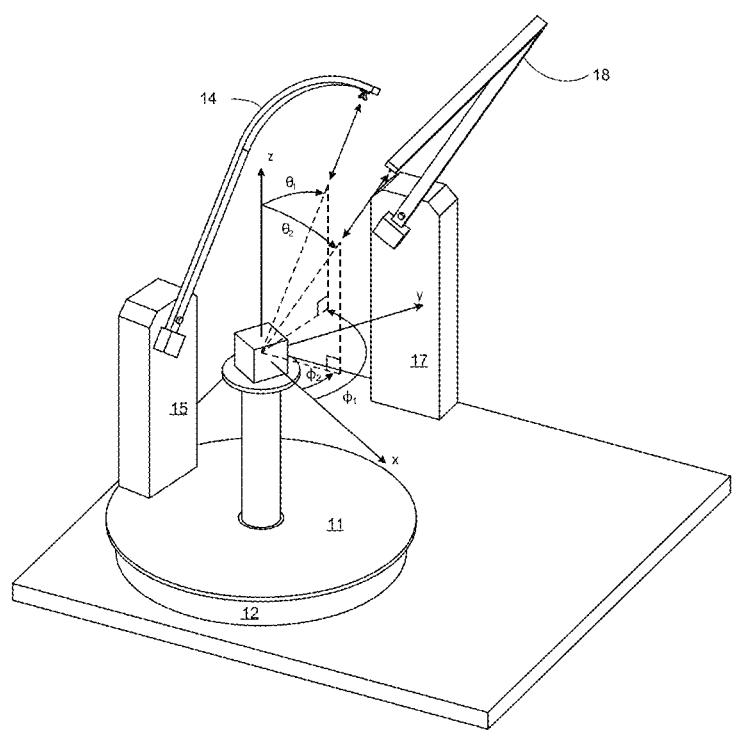
FIG. 6 illustrates a multi-axis positioning system with antennas mounted on positioner arms about a device under test mounted on a positioner.

Before describing in detail exemplary embodiments, it is noted that the embodiments reside primarily in combinations of apparatus components and processing steps related to implementation and use of voice activated laboratory environments (VALET). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Figure 7:
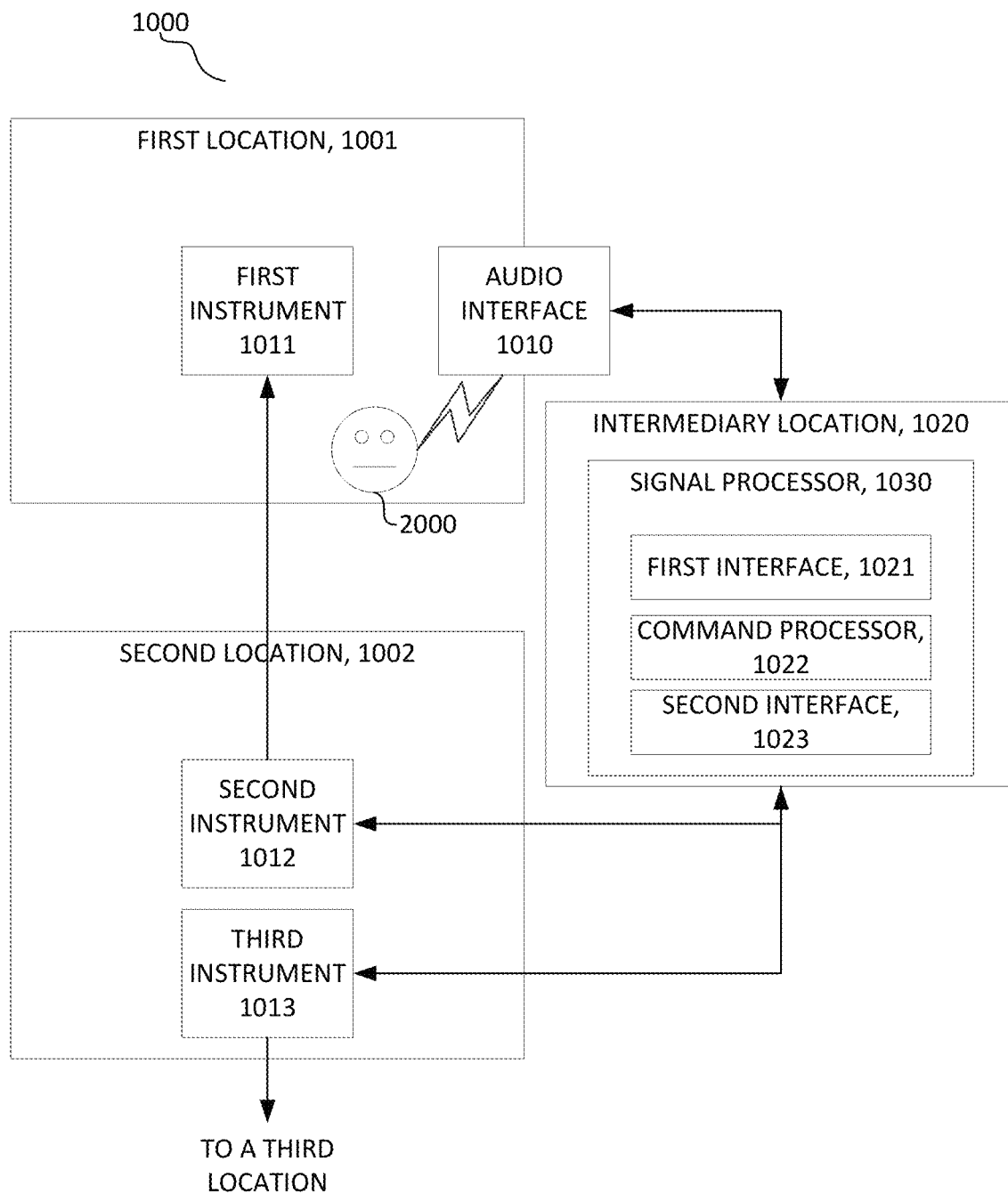
FIG. 7 is a block diagram of one embodiment of a voice activated lab environment.

FIG. 7 is a block diagram of an exemplary configuration for a voice activated lab environment (VALET) 1000. The VALET 1000 includes a first location 1001, which may be, for example, a test chamber such as an anechoic chamber or a reverberation chamber or a compact range, or other lab environment. Note that the systems described above are just some of the test configuration which can benefit from the VALET 1000 to be described below. Exterior to the first location 1001 is a second location 1002, which may be located near (or, in some embodiments, within) the first location 1001. Located within the first location 1001 or on or near a boundary of the first location 1001 is an audio interface 1010. For example, in some embodiments, the first location is an electromagnetic anechoic chamber and the audio interface 1010 may be adjacent to or located at a wall of the chamber, with an acoustically penetrable electromagnetic shield, such as honeycomb absorber, that shields the audio interface 1010 from scattering electromagnetic waves while allowing sound to be received by the audio interface 1010 from the first location 1001 and allowing sound to be transmitted by the audio interface to a person 2000 within the first location 1001. Thus, the audio interface 1010 is in acoustic proximity to the first location 1001 and may be located within the first location 1001 or on a boundary of the first location 1001.

The audio interface 1010 may be a commercially available voice assistant such as Amazon Echo, Google Home or Apple HomePod. Accordingly, the voice assistant may have a name such as Alexa, Hey Google, Ski, or Cortana. The audio interface 1010 may include a microphone to receive audio voice commands and may include at least one speaker to enunciate responses to the voice commands or initiate or conduct dialog with a person within acoustic proximity to the audio interface 1010. As used in this application, a voice command may be an instruction, a request, a statement or a question, and responses to the voice commands may include an instruction, a request, a statement, or a question.

In some embodiments, a speaker of the audio interface 1010 may emit an audible tone indicative of a frequency of operation of an instrument within the first location 1001, such that when the frequency changes, the tone changes. This tone can be started, altered or stopped by a voice command.

The first location 1001 may have at least a first instrument 1011, such as an electromechanical positioner, an antenna, a radio frequency (RF) transmitter and/or an RF receiver, a mode stirrer, a camera, a laser, or any other useful instrument that may be controlled locally or remotely from a second location 1002 exterior to the first location 1001 via a second instrument 1012, a third instrument 1013 or other instrument. In some embodiments, the second location 1002 may be far away from the first location 1001, nearby the first location 1001, or within the first location 1001.

The second instrument 1012 in the second location 1002 may be or include a position controller, a signal generator, a motor controller or other instrument that may control, affect, adjust or alter one or more instruments in the first location 1001. The second instrument 1012 may also be or include diagnostic or test equipment that displays a measurement of a signal received from the first instrument 1011. Thus, several instruments in the second location 1002 may control, affect, adjust or alter several instruments in the first location 1001 or measure signals received from instruments in the first location 1001. In some embodiments, the second instrument 1012 is, or includes, a computer with a keyboard, mouse, speakers and a video display that displays a graphical user interface that enables a user to monitor and/or control instruments in the first and/or second locations.

Within the lab environment 1000, or located remote from the lab environment may be an intermediary location 1020 where is situated instrumentation such as a signal processor 1030 within a computer or server that is connected wirelessly or by wireline to the audio interface 1020. The signal processor 1030 at the intermediary location 1020 may include a first interface 1021, a command processor, 1022 and a second interface, 1023.

Several examples will be discussed to exemplify operation of the VALET 1000. Suppose for example, that the first instrument 1011 is an electro-mechanical positioner controlled by the second instrument 1012 in the second location 1002. Suppose further that the person 2000 wants to change the position of a device under test, DUT, within a test region of the first location 1001. The user 2000 might say, "Alexa, reposition the positioner to 100 degrees." This audible command, is received by a microphone in the audio interface 1010, which in this example, is an Amazon Echo, and which is located in acoustic proximity to the user 2000. In some embodiments, the audio interface converts the audible signal to a first signal and transmits that first signal to the intermediary location 1020. The intermediary location 1020 may be a location in the Cloud accessible via an Internet connection or may be located in or near one of the first location 1001 or the second location 1002.

The signal processor 1030 at the intermediary location 1020 has a first interface 1021 that receives the first signal responsive to the voice command. A command processor 1022 is configured with voice recognition software and/or hardware, which recognizes the voice command enunciated by the user 2000 by analyzing the first signal. The analysis identifies a second instrument 1012, which in this case is a position controller, in the second location 1002 that is configured and operable to alter the operation or state of the first instrument 1011, which in this case is the electromechanical positioner. The command processor 1022 selects an instruction from a memory, which in this case is a positioning instruction, and modifies the instruction to indicate that the positioner is to be repositioned to 100 degrees. The command processor 1022 generates a signal responsive to the modified instruction, or encodes the modified instruction and embeds the encoded modified instruction in the signal generated by the command processor. The second interface 1023 sends the signal containing the modified instruction to the identified second instrument 1012. The second instrument 1012 receives the modified instruction and generates a signal to the first instrument 1011 that causes the first instrument to move to 100 degrees in accordance with the voice command received by the audio interface 1010.

Further, responsive to identifying the voice command via the voice recognition software, the command processor 1022 may generate a response signal that contains a voice signal acknowledging the voice command and acknowledging that the positioner has been repositioned. Thus, when the user 2000 says, "Alexa, reposition the positioner to 100 degrees," Alexa responds by saying, via a speaker of the audio interface 1010, "Ok. The positioner will be moved to 100 degrees," and/or Alexa says, "Ok the positioner has been moved to 100 degrees."

As another example, the user 2000 may ask, "Alexa, what is the current position of the turntable?" This audible command (question) is converted by a microphone in the audio interface 1010 to an electrical signal that is transmitted to the signal processor 1030, which interprets the command, and sends a signal to the second instrument 1012 that queries the second instrument 1012 as to what is the current position of the positioner. The second instrument responds to this query by sending a signal back to the signal processor 1030, which interprets the response, which may be, "The current position of the turntable is 100 degrees." This response is embedded in an electrical signal that is sent to the audio interface 1010, which enunciates the response via one or more speakers in the audio interface 1010.

As another example, the user 2000 may say, "Hey Google, I need technical assistance." This command is heard by the audio interface, which in this example is a Google Home device, and sent to the signal processor 1030, where it is interpreted and recognized. In response to the voice command, the signal processor 1030 sends a signal to a third instrument 1013, which may be a telephone, causing the third instrument 1013 to connect to technical support in a third location. The user may then engage in a telephone discussion with technical support via the telephone 1013, the intermediary location 1020 and the audio interface 1010.

As another example, the user 2000 may say, "Ski, change the frequency of operation to 1 gigahertz." This voice command is received by the audio interface, which in this example is an Apple HomePod, which forwards a voice signal to the signal processor 1030 which recognizes and interprets the voice command, and causes the second instrument 1012, which in this example is a signal generator, to change the frequency of a signal generated and sent to the first instrument 1011, which in this example may be a transmitter, receiver, and/or an antenna. Also, the signal processor 1030 may direct the audio interface 1010 to say, "Ok. The frequency has been changed to 1 gigahertz."

Note that in some embodiments, the first and second locations 1001 and 1002 may be about the same. For example, the first instrument 1011 may be a probe and the second instrument 1012 may be an oscilloscope to which the probe is connected by a short wireline, and the audio interface is in acoustic proximity to both the probe and the oscilloscope. In this case the user 2000 may say, "Alexa, change the time scale to 1 millisecond per division." The audio interface 1010 would transmit an electrical signal carrying this voice command to the intermediary location 1020, which may be remote or in the first location 1010. At the intermediary location 1020, a command is generated and sent to the oscilloscope to cause the time scale of the instrument to change to 1 millisecond per division. Alexa would then respond via the audio interface 1010, saying "Ok. The time scale has been changed to 1 millisecond per division." Note that although low level commands are presented herein, the system can combine these commands into sets where dozens of low level commands work in a sequence to perform larger and more complex combinations of the low level commands. Thus, for example, the user may voice the command, "Perform test A," where test A is predefined and includes a sequence of low level commands, where these commands are executed upon receipt and processing of the voice command as described herein.

The VALET 1000 may be integrated with the Totally Integrated Laboratory Environment (TILE!) system of ETS-Lindgren Inc. The TILE! software is an integrated test environment software package for performing electromagnetic compatibility tests and other tests. The VALET 1000 may also be integrated with EMQuest software, also of ETS Lindgren, Inc. The EMQuest software provides automated pattern measurements and frequency response measurements of antennas and wireless devices. A function of these software packages is to provide drivers for instruments in the test facility. These drivers are analogous to printer drivers that are supplied to convert a general print command to specific printer commands for a specific make and model of printer. Analogously, the TILE! software receives a test command and selects an instrument command understandable by a particular make and model of an instrument to execute the test command. For example, the TILE! software may have drivers for 10 different makes and models of spectrum analyzers. When a test command is received by the TILE! software, an instrument command corresponding to the test command is selected for the particular make and model of spectrum analyzer that is configured to perform the test.

Thus, many types of instruments may be controlled via the voice assistance methodologies described herein. In some applications, the VALET enables the user 2000 to use voice commands to order parts, ask a technical question, query a user manual, etc. Note also, that although the examples set forth herein recite voice commands in the English language, any other languages may be supported and used.

Figure 8:
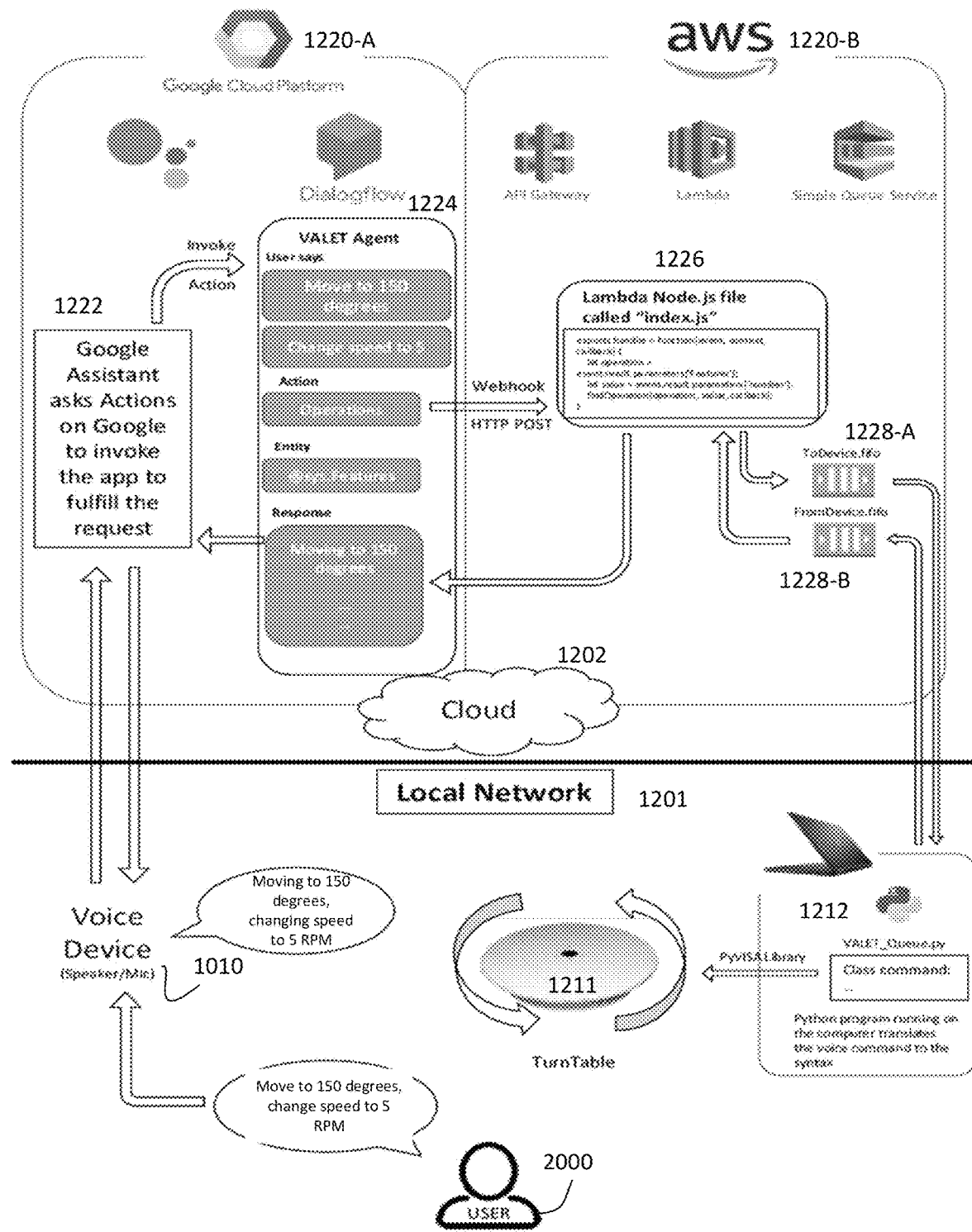
FIG. 8 is a block diagram of another embodiments of the voice activated lab environment.

FIG. 8 is another view of some embodiments, showing components and software in a local network 1201 vis-a-vis components and software located remotely in the Cloud 1202. For example, suppose the user 2000 enunciates one or more voice commands such as "Move to 150 degrees," and "Change speed to 5 RPM." The voice device (audio interface) 1010 receives this voice command by a microphone and converts the voice command to an electrical audio signal and transmits the electrical audio signal to a platform 1220-A that, in this example, is the Google Cloud Platform. Other comparable platforms may be employed.

The Google Cloud Platform has a Google Assistant 1222 that performs the function of asking an "Actions on Google" function to invoke a VALET agent 1224, the VALET agent 1224 being implemented using the Dialogflow functionality of the Google Cloud Platform, in this example. The Dialogflow is an end to end development suite that enables creation of conversational interfaces for websites, mobile applications, messaging platforms and Internet of Things (IoT) devices. It is used here to implement the VALET agent 1224. A function of the VALET agent 1224 is to convert human language to "intents" language, the intents language having a sequence of one or more commands and parameters, and identifying the target instrument that is to execute the commands responsive to the voice commands of the user 2000, thus expressing an intent of the user 2000 derived from the voice commands.

The intents language is sent to a web services platform 1220-B such as the Amazon Web Services (AWS) platform. The AWS platform is a secure cloud services platform that offers computing power, database storage, content delivery and other functionality. The AWS platform may provide services such as API Gateway, Lambda and Simple Queue Service. API Gateway is a service that enables a developer to create, publish, maintain, monitor and secure application program interfaces (APIs), thereby enabling access of data, business logic and functionality. AWS Lambda is a computing service the enables a developer or client to run computer code in the Cloud without servers. The AWS Simple Queue Service is a message queueing service that enables decoupling and scaling of services, distributed systems and serverless applications to facilitate sending, storing and receipt of messages.

A purpose of the web services platform 1220-B is to package the intents language into one or more blocks of computer instructions that can be understood by a local computer 1212 in the local network 1201. An example of a Lambda Node .js file 1226 is shown with a computer instruction that can be sent to the local computer 1212. The computer instructions to be sent to the local computer 1212 may be stored in a first in first out (FIFO) buffer 1228-A. The FIFO buffer 1228-A may be polled periodically—for example, once every second or tenth of a second—by the local computer 1212.

The local computer 1212 may be a laptop computer or may be a computer within a particular instrument (for example, the second instrument 1012) that controls the positioning of the turntable 1211. In some embodiments, in direct transmission, the local computer 1212 has a master list of all instrument commands for all instruments in the local lab environment. In these embodiments, the local computer 1212 selects the instrument command for a particular instrument (in this case, the turntable 1211) that is identified by the computer instructions obtained from the FIFO buffer 1228-A, and sends the instrument command to the instrument for execution by the instrument.

In other embodiments, the local computer 1212 accesses dedicated computer/instrument software that reads the computer instructions obtained from the FIFO buffer 1228-A, identifies the particular instrument (type, make and model) referenced by the computer instructions and looks up the particular instrument commands for that instrument and sends the looked-up instrument commands to the identified instrument. Examples of such computer/instrument software includes EMQuest and TILE software developed by ETS-Lindgren Inc. Other software with similar functionality can be employed as well so that VALET can be integrated into a variety of existing systems and be used for existing devices so long as such devices can receive instrument commands.

In this case, the instrument command causes the turntable to move to 150 degrees and changes the speed of rotation of the turntable to 5 RPMs. Simultaneously, the local computer 1212 sends a message statement to the FIFO buffer 1228-B that when processed by the AWS Lambda service 1226 and translated by the VALET agent 1224, causes the audio device 1010 to state, "Moving to 150 degrees, changing speed to 5 RPM."

Upon completion of the instrument command, the turntable instrument 1211 indicates that the instrument command has been executed. This indication is received by the local computer 1212 which generates a message statement indicating the completion of the instrument command, which message statement is translated into a computer statement that is sent by the local computer 1212 to the FIFO buffer 1228-B. The AWS Lambda service 1226 translates the computer statement to a statement that is understandable to the VALET agent 1224. The VALET agent 1224 translates the statement to an electrical audio signal that causes the audio interface 1010 to make the statement, "Moved to 150 degrees and speed changed to 5 RPM," for this example.

As another example, the user 2000 may ask, "What is the current frequency'?" to ascertain the current frequency of operation of an antenna in an anechoic chamber. This may be processed as described above by the Cloud platforms 1220-A and 1220-B so that a query in a language understandable to an instrument that controls the frequency of operation of the antenna is delivered to that instrument. The instrument responds by answering the query with a frequency, for example, 200 MHz. The local computer 1212 receives this information, packages it and transmits it to the Cloud platforms which process the information and deliver an electrical audio signal to the voice device 1010, causing the voice device 1010 (also referred to herein as the audio interface 1010) to enunciate "The frequency of the antenna is 200 Mhz."

Thus, the VALET software supports at least two methods of command translation to translate computer commands to instrument commands. In a direct method, a voice command is translated to an intent command that is translated to a computer command that is translated to an instrument command for the particular instrument identified based on the voice command. In an indirect method, a secondary software program—which may be commercially available off the shelf (COTS) software—is used to obtain the instrument commands. The indirect method allows for a universal set of voice commands for each category of equipment. Categories of equipment may be associated with different makes and models of a type of equipment, such as different makes and models of a spectrum analyzer.

For example, a universal set of voice commands may be converted to a common group of functions required for any spectrum analyzer. This will enable sending an intent command (packaged into a computer instruction) to the COTS software (such as EMQuest or TILE!). The intermediary software will translate the intent command into the model's specific Standard Commands for Programmable Instruments (SCPI) that the instrument can understand. This indirect method provides a command conversion capability such that the VALET can provide a signal command set for a given type of instrument, but yet be able to control numerous makes and models of instruments. For example, a voice command to change a center frequency of a spectrum analyzer may first be translated to an intent command, "Set center frequency to 100 MHz." This may then be input to the COTS software process to select an SCPI instrument command that is particular to the particular make and model of spectrum analyzer in the local environment of the local network 1201.

In some embodiments, the local computer 1212 may send the instrument commands to the instrument using an industry standard communication library called the Virtual Instrument Software Architecture (VISA). VISA is a library for configuring, programming and troubleshooting instruments that use interfaces such as the General Purpose Interface Bus (GPIB), VXI, PXI, Serial bus, Ethernet, and/or Universal Serial Bus (USB) interfaces.

Note that the use of the FIFO buffer 1228-A enables transmission of computer commands from the Lambda node 1226 to the local computer 1212 without affecting the protection provided by a firewall implemented by the local computer 1212 or an intermediary computer in the local network 1201 that intervenes between the local computer 1212 and the Cloud 1202. Ordinarily, a firewall might not allow unsolicited commands to be received by an internal computer system protected by the firewall from an external source. To overcome this, without altering the protection provided by the firewall—which may be objected to by Information Technology management personnel—the local computer 1212 periodically polls the FIFO buffer 1228-A to access and receive the commands in the FIFO buffer 1228-A.

Note also that VALET can work with existing voice assistants or voice assistants to be developed in the future, because the VALET agent 1224 may be implemented to use a standard set of intents commands that are independent of the voice assistant used.

Further, in some embodiments, the user 2000 may enunciate a command that indicates repetitive or continuous change in the state of the first instrument 1011 or its operation. For example, in a lab environment having a second instrument 1012 such as an oscilloscope or a volt meter, the user may say, "Measure voltage 10 times." VALET would cause the first instrument 1011 to measure the voltage of a device 10 times and report the results of the ten measurements to the user 2000 via the voice device 1010 as the measurements are being taken. In this example, it may be possible for the user to adjust a state of the device being measured while the 10 measurements are being made to determine how the state of the device affects the measurement. This enables a user 2000 to enunciate a single command to perform an act repetitively without multiple utterances of commands. As another example, the user 2000 may say, "Measure power continuously." In response to this command, VALET would cause the first instrument to perform continuous power measurement until countermanded.

Note further that VALET works with any instrument that can receive an instrument command, regardless of how old the instrument is, to convert the instrument to a voice-controlled instrument, without making any changes to the instrument. For example, the VALET system described herein can be implemented in the context of medical instrumentation, so that, for example, a heart surgeon can utter the voice command, "VALET, start heart pump," to start a heart pump. As another example in the context of automotive instrumentation, a mechanic may utter the voice command, "VALET, start car and measure block temperature," to start a car and measure its block temperature. As another example, in a military context, an injured airman who can't use his hands may issue the voice command, "VALET, engage ejection sequence," to cause ejection from an aircraft.

Also, VALET is portable and can be moved from one lab environment to another lab environment. This can be done by carrying the audio interface 1010 and the local computer 1212 (which conveniently can be a laptop or tablet computer) from one lab to another. For example, suppose a device is to be tested at first work bench having a voltmeter followed by being tested at a second workbench having a spectrum analyzer. The same audio interface 1010 and laptop computer 1212 can be used at each workbench successively to control the voltmeter and spectrum analyzer by voice.

Figure 9:
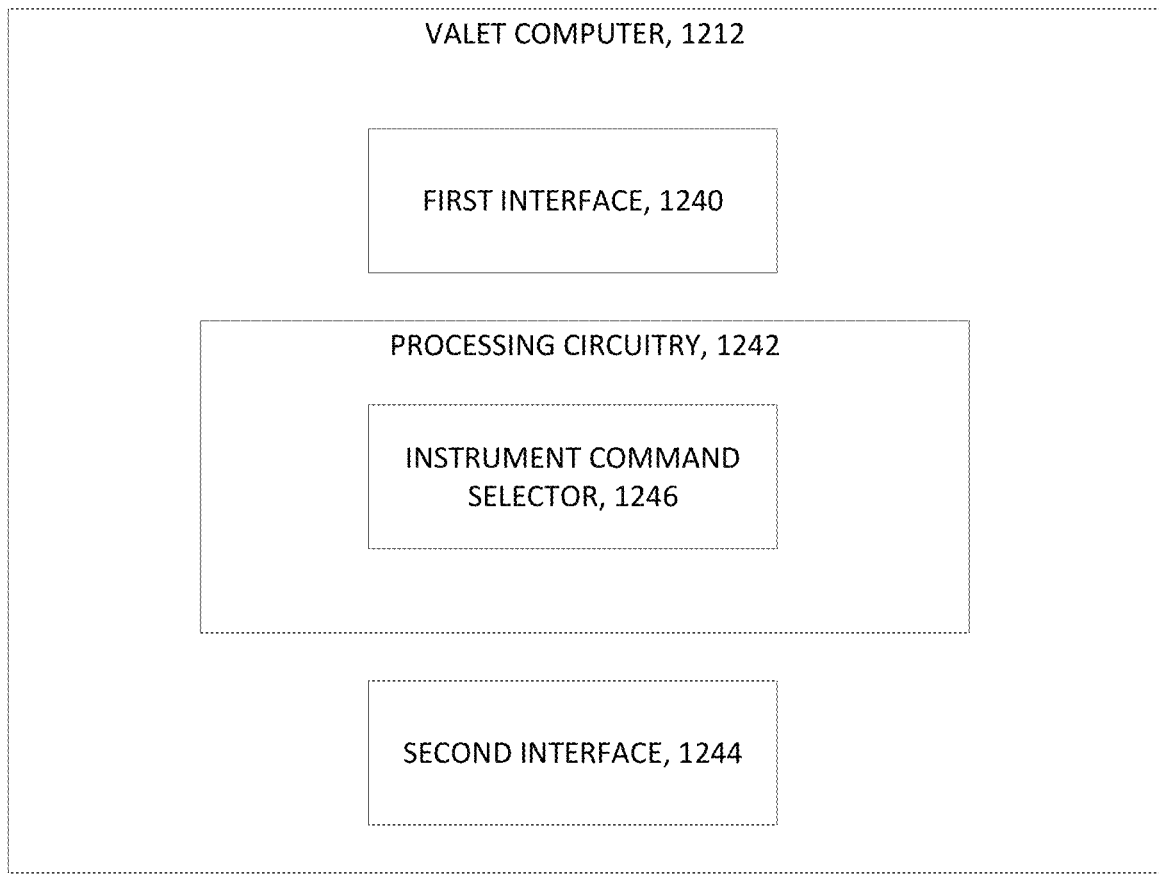
FIG. 9 is a block diagram of a VALET computer.

FIG. 9 is a block diagram of a VALET computer 1212 configured to control an instrument in response to a voice command detected by an audio interface. The computer 1212 includes a first interface 1240 to receive a computer instruction from an intermediary location, the computer instruction conveying an identity of an instrument and a command derived from the voice command detected by the audio interface. The computer 1212 also includes processing circuitry 1242 that includes an instrument command selector 1246 configured to select an instrument command to cause the instrument to effectuate the voice command. The instrument command selector 1246 may include COTS software such as EMQuest or TILE! software, owned by ETS Lindgren Inc. The computer 1212 also includes a second interface 1244 to issue the instrument command to the instrument.

Figure 10:
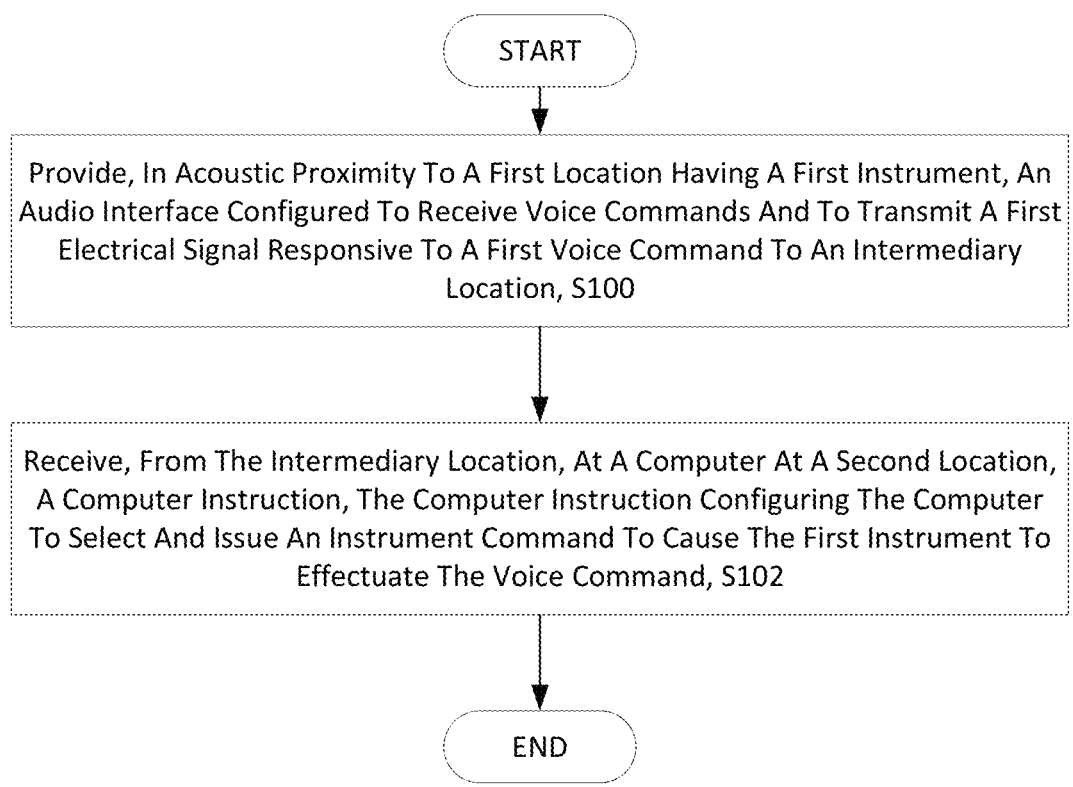
FIG. 10 is a flowchart of an exemplary process for controlling an instrument by voice command.

FIG. 10 is a flowchart of an exemplary process for controlling an instrument by voice command. The process includes providing, in acoustic proximity to a first location having a first instrument in the lab environment, an audio interface configured to receive voice commands and to transmit a first electrical signal responsive to a first voice command to an intermediary location (block S100). The process also includes receiving, from the intermediary location, at a computer at a second location, a computer instruction, the computer instruction configuring the computer to select and issue an instrument command to cause the first instrument to effectuate the voice command (block S102).

Figure 11:
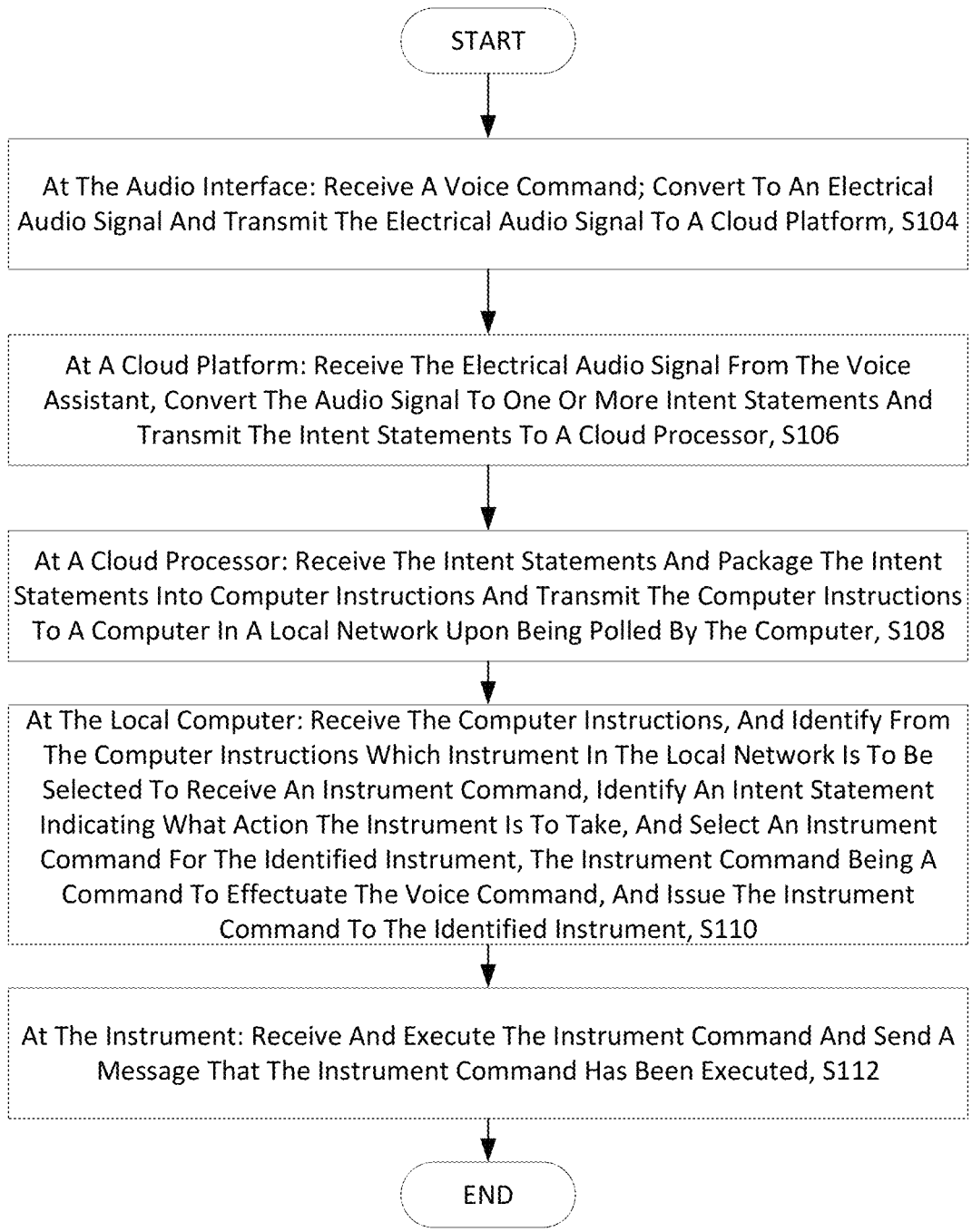
FIG. 11 is a flowchart of an exemplary process for voice control of an instrument.

FIG. 11 is a flowchart of an exemplary process for voice control of an instrument. The process includes, at the audio interface: receiving a voice command; converting to an electrical audio signal and transmitting the electrical audio signal to a cloud platform, (block S104). The voice command may include, for example, a command to rotate a turntable, a command to change a frequency of transmission or reception of a transceiver, a command to change a position of an arm holding an antenna, a command to change the center frequency of a display of a spectrum analyzer, perform a measurement by a measurement instrument, etc. The process includes, at a cloud platform: receiving the electrical audio signal from the voice assistant, converting the audio signal to one or more intent statements and transmitting the intent statements to a cloud processor, (block S106). The process further includes, at a cloud processor: receiving the intent statements and package the intent statements into computer instructions and transmitting the computer instructions to a computer in a local network upon being polled by the computer, (block S108). The processor includes, at the local computer: receiving the computer instructions, and identifying from the computer instructions which instrument in the local network is to be selected to receive an instrument command, and identifying an intent statement indicating what action the instrument is to take, and selecting an instrument command for the identified instrument, the instrument command being a command to effectuate the voice command, and issuing the instrument command to the identified instrument, (block S110). The process further includes, at the instrument: receiving and executing the instrument command and sending a message that the instrument command has been executed, (block S112).

Some embodiments are as follows:

Embodiment A1. A method for controlling a lab environment, the lab environment including at least one of electrical, mechanical and electro-mechanical instrumentation, the method comprising:

providing, in acoustic proximity to a first location having a first instrument in the lab environment, an audio interface configured to receive voice commands, to enunciate responses to the voice commands and to transmit a first electrical signal responsive to a first voice command to an intermediary location; and receiving, from the remote location, at a second location having a second instrument in the lab environment, a second electrical signal responsive to the first voice command to effectuate adjustment of the second instrument in accordance with a request articulated by the first voice command, the second instrument operable to control the first instrument according to the request.

Embodiment A2. The method of Embodiment A1, wherein the first location in the lab environment is a test region and the second position in the lab environment is in a control and/or monitoring region for controlling and/or monitoring a test of a device in the test region.

Embodiment A3. The method of Embodiment A2, wherein the test region is enclosed in a test chamber and the control/monitoring region is external to the test chamber.

Embodiment A4. The method of Embodiment A3, wherein the audio interface is positioned at a boundary of the test chamber and at least partially electromagnetically shielded via an acoustically penetrable electromagnetic shield.

Embodiment A5. The method of Embodiment A1, wherein the first instrument is a positioner and the second instrument is operable to control a position of the positioner responsive to a position or change in position articulated by the first voice command.

Embodiment A6. The method of Embodiment A1, wherein the first instrument is one of a transmitter and a receiver and the second instrument is operable to control a frequency of operation of the first instrument responsive to a frequency or change in frequency articulated by the first voice command.

Embodiment 6A. The method of Embodiment A6, wherein the audio interface is caused to vary a tone of an audio signal in response to a change in frequency caused by the second instrument in response to the first voice command.

Embodiment A7. The method of Embodiment A1, wherein the first instrument is an antenna and the second instrument is operable to generate a third electrical signal to cause radiation by the antenna of a signal derived from the third electrical signal, the third electrical signal being generated according to an instruction articulated by the first voice command.

Embodiment A8. The method of Embodiment A1, wherein:
the second electrical signal is converted to an audio signal articulating the request; and
adjustment of the second instrument is effectuated by a human being responsive to the audio signal.

Embodiment A9. The method of Embodiment A1, further comprising:
sending, from the second location to the intermediary location, a third signal indicative of a state of the first instrument as determined by the second instrument;
receiving from the intermediary location, at the first location, a fourth signal indicative of the state of the first instrument as determined by the second instrument; and
responsive to the fourth signal, enunciating by the audio interface a response pertaining to the state of the first instrument as determined by the second instrument.

Embodiment A10. The method of Embodiment A1, wherein the second instrument is a telephone and the second electrical signal is a voice signal.

Embodiment A10. The method of Embodiment A1, wherein, when the first voice command is a request that inquires concerning a state of the first instrument, the second message concerns a state of the first instrument as determined by the second instrument.

Embodiment A11. The method of Embodiment A1, wherein the intermediary location is the same as or in proximity to the second location.

Embodiment A11A. The method of Embodiment A1, wherein the intermediary location is the same as or in proximity to the first location.

Embodiment A11B. The method of Embodiment A1, wherein the first location is the same as or in proximity to the first location.

Embodiment A12. The method of Embodiment A1, wherein the audio interface is one of an Amazon Echo device, a Google Home, device and an Apple HomePod device.

Embodiment A13. The method of Embodiment A12, wherein the audio interface responds to a spoken name that is one of Alexa, Hey Google, Siri and Cortana.

Embodiment A14. The method of Embodiment A1, wherein the first voice command is one of an instruction, a request and a question.

Embodiment B1. A voice activated lab environment (VALET), comprising:
a first instrument in a first location;
in acoustic proximity to the first location, an audio interface configured to receive voice commands, to enunciate responses to the voice commands, and to transmit a first signal responsive to a first voice command to an intermediary location; and
a second instrument in a second location, the second instrument configured to receive an input generated in response to the first signal, the second instrument being operable to control the first instrument according to the first voice command.

Embodiment B2. The VALET of Embodiment B1, wherein the first location is a test region and the second location is a monitoring/control station.

Embodiment B3. The VALET of Embodiment B2, wherein the test region is in a test chamber and the monitoring/control station is exterior to the chamber.

Embodiment B4. The VALET of Embodiment B1, wherein the audio interface is shielded by an acoustically penetrable electromagnetic shield.

Embodiment B5. The VALET of Embodiment B1, wherein the first instrument is a positioner and the second instrument is operable to control a position of the positioner responsive to the voice command.

Embodiment B6. The VALET of Embodiment B1, wherein operation of the first instrument varies according to a frequency and the second instrument varies the frequency responsive to the voice command.

Embodiment B7. The VALET of Embodiment B1, wherein the first signal is converted to one of sound and image and the input generated in response to the first signal is an input by a human perceiving the sound and/or image.

Embodiment B8. The VALET of Embodiment B1, wherein the first voice command is a question and the audio interface answers the question based on a signal received from the intermediary location, the signal received from the intermediary location being based on a signal received from the second instrument.

Embodiment B9. The VALET of Embodiment B1, wherein the intermediary location is in proximity to, or is the same as, the second location.

Embodiment B10. The VALET of Embodiment B2, wherein the first location is in proximity to, or is the same as, the second location.

Embodiment B11. The VALET of Embodiment B1, wherein the first voice command is one of an instruction, a request and a question.

Embodiment C1. An intermediary system for interpreting and relaying commands from and to an audio interface, the system comprising:
a first interface configured to receive a first signal responsive to a voice command received by the audio interface located in acoustic proximity to a first instrument;
a command processor configured to:
recognize the voice command by analysis of the first signal, the analysis of the first signal identifying a second instrument operable to alter operation of the first instrument;
select an instruction in response to the recognized voice command, the instruction configured to cause the second instrument to alter operation or state of the first instrument; and
generate a signal responsive to the instruction; and
a second interface configured to send the signal responsive to the instruction to the second instrument.

Thus, according to some embodiments, a voice activated lab environment (VALET) allows voice interaction with test chambers and measurement instruments to provide intelligent assistance in the chamber or at a test bench, for example. The VALET system described herein can be removably installed in any lab environment and be retrofitted in all measurement environments including RF anechoic and reverberation chambers, and acoustic chambers. In some embodiments, the VALET can be integrated with software and instrumentation, such as EMQuest and/or TILE! software provided by ETS Lindgren Inc., as well as third party software and instrumentation. VALET can be used to connect telephones, call technical support, provide audio of excerpts of a manual, turn on the phone for testing, turn on lasers from outside a chamber, take detailed measurements, provide live updates and be integrated with TILE! software. Commercial off the shelf (COTS) software can be employed to assist in utilizing voice assistants to make intelligent test chambers and measurement environments. Some hardware may include smart speakers such as Amazon Echo, Google Home and Apple HomePod. Voice assistant names may include Amazon's Alexa, Google's Hey Google, Apple's Siri and Microsoft's Cortana. The design of VALET can be integrated into advanced RF measurement environments, for example. VALET may be designed to work in electrically sensitive environment so that the VALET system is not affected by electromagnetic fields and will not interfere with RF fields in the test environment. For example, an acoustically penetrable honeycomb structure can be used to allow sound to pass while preventing electrical noise from interfering with testing. The VALET system also works well in tightly controlled Information Technology departments.

As a further example using Alexa, the user may enunciate the voice command, "Alexa, ask the turntable positioner to turn the turntable to 100 degrees." The Echo Dot will pick up the sound waves and will have Alexa use the Cloud to translate the speech to text with a natural language processor. The text may then be filtered through an Alexa skill which picks the appropriate action to add to a queue. The commands in the queue, using FIFO, are sent to a command router. The router has the Internet Protocol (IP) address of the hardware and software the command is being sent to. Using the command "SK 100" the turntable will move to 100 degrees. Once the turntable has received the command, any feedback is sent through the process and spoken back to the user. As yet a further example, the user may say, "Alexa, what is the current position of the turntable. Alexa will get the requested information using another skill to ask the turntable command, "CP?" Alexa will tell the user the current position of the turntable.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method for controlling at least one instrument in a lab environment, the method comprising:
   providing, in acoustic proximity to a first room having an electromechanical positioner and a radio transmitter, an audio interface configured to receive voice commands from a user in the first room, the voice commands including instructions to set a position of the electromechanical positioner and a frequency of the radio transmitter, the audio interface configured to transmit a first electrical signal responsive to the voice commands to an intermediary location at least partially exterior to the first room;
   generating at the intermediary location, computer instructions responsive to the first electrical signal, the computer instructions being responsive to the voice commands from the user in the first room; and
   receiving, from the intermediary location, by a second instrument at a second location exterior to the first room, the computer instructions, the computer instructions configuring the second instrument to issue instrument commands to set the electromechanical positioner and the radio transmitter in the first room to the position and frequency of the radio transmitter in accordance with the voice commands while the user remains in the first room after issuing the voice commands.

2. The method of claim 1, wherein the instrument command is selected from a table of instrument commands associated with the one of the first and second instrument.

3. The method of claim 1, wherein the instrument command is selected via a computer program that associates a universal set of voice commands with an instrument type, and associates a voice command with an instrument command for a particular make and model of the instrument type.

4. The method of claim 1, wherein the instrument command is issued by using a Virtual Instrument Software Architecture (VISA).

5. The method of claim 1, wherein the second instrument obtains the computer instruction by polling a buffer at the intermediary location.

6. The method of claim 1, wherein the voice command is a command to direct the first instrument to perform a sequence of operations and the second instrument issues at least one instrument command to cause the first instrument to perform the sequence of operations.

7. The method of claim 1, wherein the first location in the lab environment includes a test region and the second location is in a control and monitoring region for controlling and monitoring a test of a device in the test region.

8. The method of claim 1, wherein the audio interface and the second instrument are portable.

9. The method of claim 1, wherein the voice commands include a query about a current setting of position and frequency and the method further includes:
   perform by the second instrument:
      receiving computer instructions from the intermediary in response to the query;
      determining a response to the query; and
      issuing a signal indicative of the response to the intermediary location;
   perform at the intermediary location:
      translating the signal indicative of the response to an electrical signal to drive a speaker of the audio interface to enunciate an audio response to the query.

10. The method of claim 1, further comprising, responsive to the voice commands, reporting a result of a measurement by the second instrument via the intermediary location to the audio interface to provide an audio report of the measurement.

* * * * *